Figure 1:
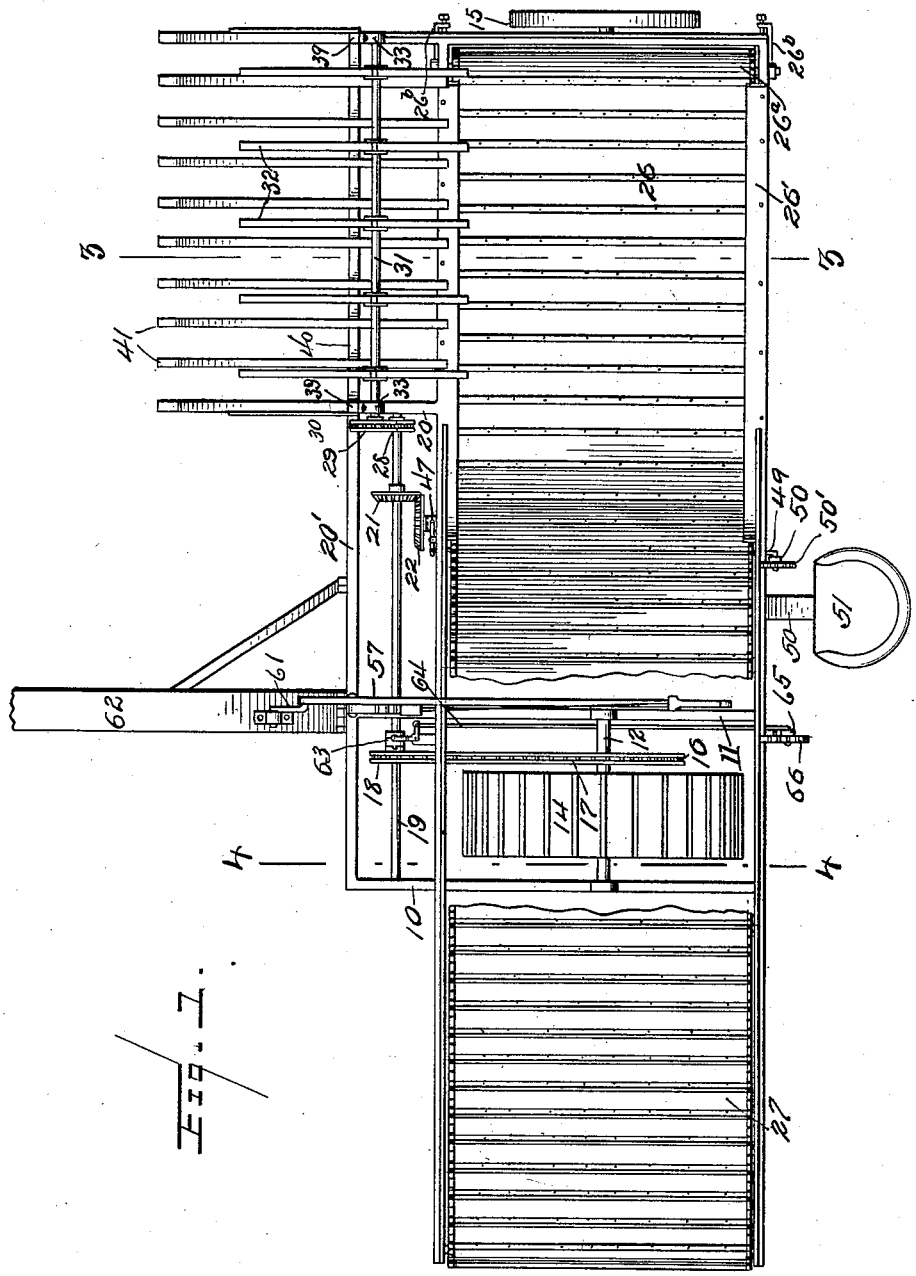

J. H. HUFFMAN.
BUNDLE GATHERER AND LOADER.
APPLICATION FILED MAR. 22, 1912.

1,085,913.

Patented Feb. 3, 1914.

3 SHEETS—SHEET 2.

WITNESSES:

INVENTOR
John H Huffman
BY
Attorney.

J. H. HUFFMAN.
BUNDLE GATHERER AND LOADER.
APPLICATION FILED MAR. 22, 1912.

1,085,913.

Patented Feb. 3, 1914.
3 SHEETS—SHEET 3.

WITNESSES:

INVENTOR
John H. Huffman
BY
Attorney

UNITED STATES PATENT OFFICE.

JOHN H. HUFFMAN, OF CULLOM, ILLINOIS.

BUNDLE GATHERER AND LOADER.

1,085,913.  Specification of Letters Patent.  Patented Feb. 3, 1914.

Application filed March 22, 1912. Serial No. 685,643.

*To all whom it may concern:*

Be it known that I, JOHN H. HUFFMAN, a citizen of the United States, and residing at Cullom, in the county of Livingston and State of Illinois, have invented certain new and useful Improvements in Bundle Gatherers and Loaders, of which the following is a specification.

This invention relates to certain new and useful improvements in bundle gatherers and loaders, and which consists of a machine provided with appliances or devices for picking up, and elevating and discharging the bundles into a wagon or other suitable vehicle, as will be hereinafter more fully described and claimed.

The invention has for its object, the construction of a machine of simple and inexpensive form by means of which bundles or sheaves may be readily gathered up from the ground, transferred from the gatherer on to a traveling platform or carrier, and from the platform or carrier elevated to a point of discharge where they will drop into a wagon or like vehicle positioned to receive the same.

One of the objects of my invention is to provide a machine of the above described type in which means is provided whereby the machine may be driven over the field with the receiving platform and the delivering carrier or conveyer stationary whereby the machine may be driven around over the field to gather up isolated bundles or shocks of grain, and the same conveyed to a desirable point for delivery, at which time, the platform and the delivery carrier or conveyer may be thrown into operation for discharging the bundles to the wagon or other vehicle.

Briefly described, my invention comprises in connection with a suitable supporting frame, a drive wheel for the supporting frame, a series of pick up arms or fingers adapted to travel along the ground and pick up the bundles or sheaves, a gatherer provided with gathering arms which engage the bundles or sheaves picked up by the gathering arms or fingers and move the same rearwardly on to a traveling platform, which latter conveys the bundles or sheaves to an inclined delivery carrier or conveyer that discharges them into the wagon or other vehicle, means being provided whereby the travel of the platform and the delivery carrier or conveyer may be discontinued at will, in order that the gathering arms may pick up sheaves or bundles and deposit them on the platform until such time as it is desired to discharge the same.

Figure 2:
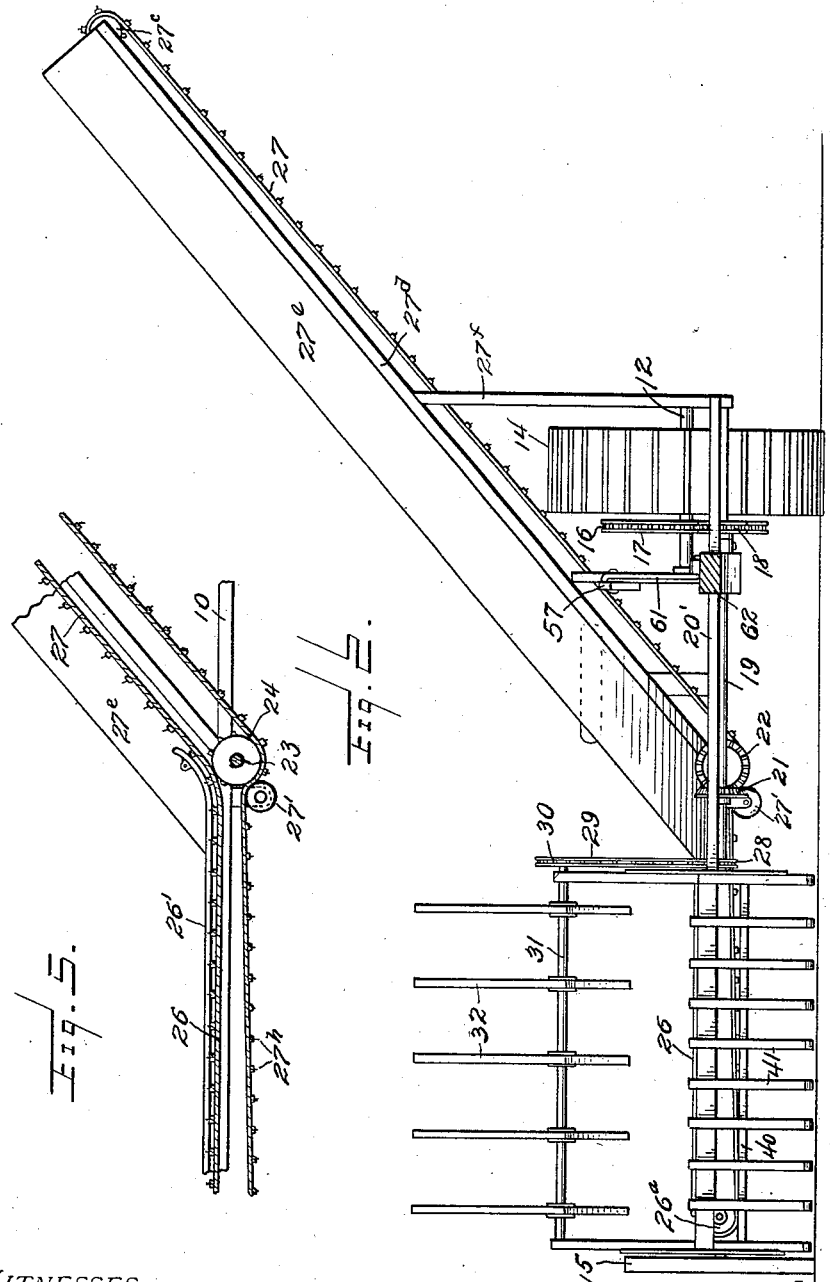
Figure 3:
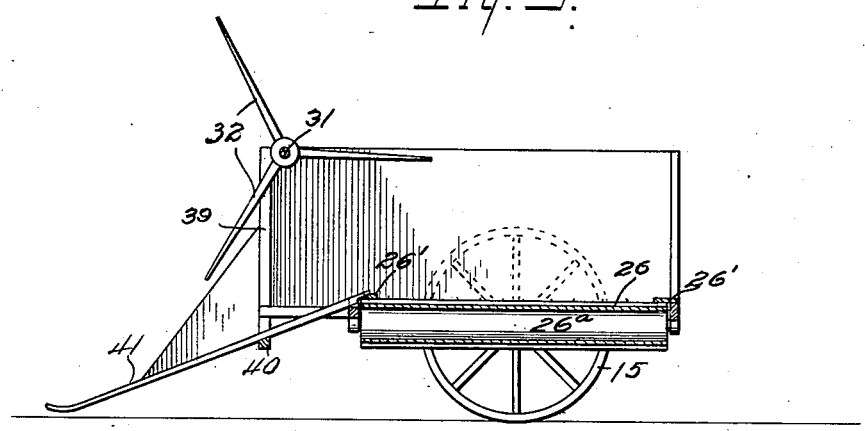
Figure 4:
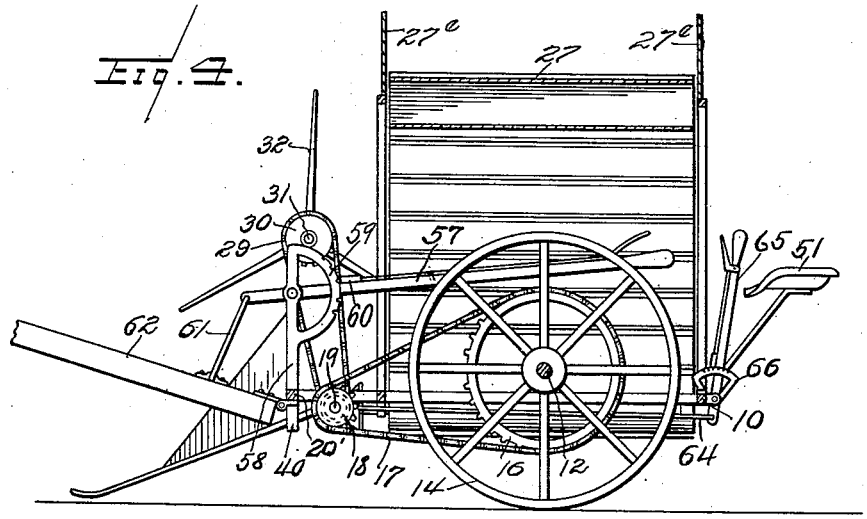

In describing the invention in detail, reference will be had to the accompanying drawings forming a part of this application, and wherein like numerals of reference will be employed for designating like parts throughout the different views of the drawings, in which:

Figure 1 is a top plan view of a bundle gatherer in accordance with my invention. Fig. 2 is a front elevation thereof, the draft tongue being in section. Fig. 3 is a transverse vertical sectional view taken on the line 3—3 of Fig. 1. Fig. 4 is a similar view taken on the line 4—4 of Fig. 1, and, Fig. 5 is a detail central longitudinal view of a part of the traveling platform and elevating carrier or conveyer.

To put my invention into practice, I provide a frame 10 comprising side bars and end bars, and in one of the end bars and in a cross-bar 11 spaced some distance from said end bar, I journal an axle 12 which carries the drive wheel 14. This drive wheel is located at one end of the frame, the opposite end of the frame being supported by means of a wheel 15.

On the axle 12 is a sprocket wheel 16 connected by a sprocket chain 17 to a sprocket 18, the latter mounted upon a shaft 19 which is journaled in one of the end bars of the frame in the cross-bar 11, and in a cross-bar 20 which connects the front side bar of the frame 10 to a front rail 20'.

The shaft 19 carries a beveled gear 21 which meshes with a beveled gear 22 carried on the forward end of a cross-shaft 23 (see Fig. 5) journaled in the side bars of the frame 10, and provided with a drive sprocket 24 under and over which travels an endless conveyer. This conveyer is adapted to travel horizontally at one point, and at another point at an inclination, the portion where it travels horizontally being designated generally as 26 and constituting a traveling platform, while the inclined travel provides an elevating and delivering section and is designated generally as 27. In its travel, the endless conveyer passes over the aforesaid sprockets 24, being held down so as to travel horizontally for the desired distance by shoes 26', idlers 27' being provided adjacent the sprockets 24, over which such conveyer travels. The frame 10 is provided at its outer end with a shaft 26ª over which the conveyer travels, for which suitable adjusting members as 26ᵇ may be provided to take up any slack in the conveyer. Said shaft carries, of course, suitable sprocket wheels over which the conveyer chains travel. Upon leaving the shoes 26' the conveyer travels at an incline upwardly and over sprockets 27ᶜ on a shaft provided at the upper end of the inclined carrier frame 27ᵈ which is preferably provided with side boards 27ᵉ in order to prevent the bundles dropping off and is suitably supported from the frame 10 as by braces 27ᶠ. In order to insure travel of the bundles with the conveyer, the slats of the latter are usually provided with pins 27ʰ. It is obvious that the conveyer may be in the form of a belt, roller driven instead of chain and sprocket driven as above described. The shaft 19 also carries a sprocket 28 which receives a chain 29 traveling over said sprocket and over a sprocket 30 carried on the end of a shaft 31.

On the shaft 31 is a plurality of sets of radial arms 32, the arms and shaft constituting a reel-like structure to engage the bundles as they are picked up by the rake teeth or fingers of the machine, and move such bundles or sheaves rearwardly on to the traveling platform as will be hereinafter more fully described.

The shaft 31 is suitably journaled in bearings 33 carried by uprights 39, and attached to the lower ends of these uprights is a brace 40, which extends along underneath the gathering fingers 41 and serves as a support for such fingers. These fingers are suitably connected to the frame 10 in any desirable manner, and extend downwardly therefrom at an inclination, such as will cause the forward ends of the fingers to lie in close proximity to the ground, and thus pass under the sheaves or bundles, so that the sheaves or bundles will be gathered up by the fingers or arms, where they will be engaged by the arms 32, and during the sweep of said arms will be carried rearwardly and deposited on to the traveling platform portion of the conveyer by which they are conveyed to the delivery portion of such conveyer and discharged into a wagon or other suitable vehicle. The gathering fingers are preferably curved upwardly slightly at their forward ends to prevent danger of their entering the ground when thrown in contact therewith.

In order that the operation of the endless conveyer may be discontinued at will, I provide a clutch 47 for effecting unitary motion between gear 21 and shaft 23, this clutch being operated by a rod 49 connected at the rear end to a lever 50 having the usual spring catch for engagement with segment 50' by which the clutch is held in the engaged or disengaged position. This lever 50 is located convenient to the driver's seat 51.

The endless conveyer constituting the platform delivery carrier for the bundles or sheaves preferably has its cross slats provided with spikes or equivalent means for holding the bundles or sheaves and assuring the delivery thereof by the platform section and the delivery section of the conveyer respectively.

In order that the frame of the machine as a whole may be tilted, and the inclination of the fingers or pick up members 41 thereby controlled, I provide a tilting lever 57, the rear end of which is in a position to be readily reached from the driver's seat, and the forward end of which is pivotally connected to an upright as 58, such upright being provided with the usual segment as 59, having notches or teeth to receive the spring-pressed catch rod as 60 of said lever. The forward end of the lever 57 projects beyond the upright 58 and is connected as by a link 61 to the draft tongue 62.

The machine is thrown in or out of gear by a suitable clutch as 63 arranged on the shaft 19 for engagement with or disengagement from the sprocket 18, such clutch being operated by a rod 64 connecting at its rear end with a lever 65 having the usual spring catch for engagement with the toothed segment 66, such lever 65 being disposed where it may be readily reached by the driver from his seat 51.

It will be observed that with the clutch 63 in engagement with the sprocket 18, that as the machine moves forward, the drive wheel 14 causes rotary movement to be imparted to the shaft 19 through the sprocket chain 17, and the revolving of shaft 19 causes, through the sprocket wheels 28, 30 and sprocket chain 29, a rotary movement to the shaft 31, causing the gathering arms 32 as they are revolved to rake the bundles or sheaves received on the fingers or gathering members 41, rearwardly on to the platform section 26 of the conveyer. As the bundles or sheaves are received on the platform section 26, they are conveyed thereby to the delivery section 27 of the carrier, by which latter they are deposited over the upper end of such delivery carrier section on to a wagon or like vehicle disposed in position to receive the same, in the well known manner.

Where it is desired to discontinue the operation of the platform and delivery carrier in order that the machine may be driven around over the field to gather up scattered bundles or sheaves, or scattered shocks the operator by manipulating the lever 50 disconnects the clutch 47 so that shaft remains stationary, the gathering arms however, continuing in operation, so that the bundles or sheaves raked back on to the platform will remain in such position until lever 50 is again operated to throw the conveyer comprising the platform section and delivery section into operation.

Having fully described my invention, what I desire to secure by Letters Patent is:—

A bundle or sheaf gatherer comprising a main frame, a traction wheel journaled in said frame near one end thereof, a supporting wheel for the other end of said frame, a traveling conveyer comprising a platform section and a delivery section, said conveyer being continuous and having the platform section traveling horizontally and the delivery section traveling at an incline, an inclined carrier frame for the delivery section supported by the main frame and projecting beyond one end thereof, shoes on the main frame for effecting a horizontal travel of said conveyer for a portion of its course, pick up fingers disposed at an inclination to the frame to gather up the bundles or sheaves and connected at their inner ends to the front bar of the frame, uprights carried by said frame in front of the platform section of the carrier, and extending below the frame, a brace connecting said uprights below the frame and constituting a support for the pick up fingers intermediate their ends, a shaft journaled in said uprights, a plurality of gathering arms carried by said shaft, driving means for said shaft and the conveyer operated from said traction wheel, means for discontinuing the travel of the conveyer irrespective of the gathering arms shaft, and means for tilting the frame to regulate the incline of the pick up fingers.

In testimony whereof I affix my signature in presence of two witnesses.

JOHN H. HUFFMAN.

Witnesses:
EDWARD J. JENSEN,
ANDREW JENSEN.

---

Copies of this patent may be obtained for five cents each, by addressing the "Commissioner of Patents, Washington, D. C."